(12) United States Patent
Castleman

(10) Patent No.: US 6,446,346 B1
(45) Date of Patent: Sep. 10, 2002

(54) ROTARY BLADE FOR TRIMMERS AND BRUSH CUTTERS

(76) Inventor: John Charles Castleman, 11545 SE. Flavel St., Portland, OR (US) 97266

( * ) Notice: Subject to any disclaimer, the term of this patent is extended or adjusted under 35 U.S.C. 154(b) by 0 days.

(21) Appl. No.: 09/686,481

(22) Filed: Oct. 10, 2000

Related U.S. Application Data

(63) Continuation of application No. PCT/US00/03272, filed on Feb. 8, 2000.
(60) Provisional application No. 60/121,405, filed on Feb. 22, 1999.

(51) Int. Cl.[7] ............................................. A01D 34/412
(52) U.S. Cl. .............................. 30/276; 30/347; 56/12.7; 56/295
(58) Field of Search ..................... 30/276, 347; 56/12.7, 56/295

(56) References Cited

U.S. PATENT DOCUMENTS

| | | | |
|---|---|---|---|
| 4,756,146 A | 7/1988 | Rouse | 56/12.7 |
| 4,905,465 A | 3/1990 | Jones et al. | 56/295 |
| 5,299,647 A | 4/1994 | Mudd et al. | 172/555 |
| 5,493,785 A | 2/1996 | Lawrence | 30/347 |
| 5,617,636 A | 4/1997 | Taggett et al. | 30/276 |
| 5,640,836 A | 6/1997 | Lingerfelt | 56/255 |
| 5,845,405 A | 12/1998 | Rosdahl | 30/276 |

*Primary Examiner*—Hwei-Siu Payer
(74) *Attorney, Agent, or Firm*—Chernoff, Vilhauer, McClung & Stenzel, LLP

(57) ABSTRACT

A rotary blade (10, 110, 160) for a weed cutter, trimmer, or brush cutter and including a hub (20, 112, 162), in a first plane (28), a cup (30, 114, 164), a crown (32, 116, 166), in a second plane (34), and an outer skirt (40, 118, 168) whose margin defines a third plane (44), with the second and third planes (34, 44) parallel with and preferably on opposite sides of the first plane (28). The outer skirt (40, 118, 168) and the crown (32, 116, 166) protect the driving shaft (16) and the arbor (12) on which the rotary blade (10, 110, 160) is mounted from having fibrous material accumulate and wrap about it. Outer tips (72, 78, 86) of the cutters (50, 54, 58) rotate in different planes, thus cutting materials into short pieces and also helping thereby to protect the shaft (16) and arbor (12). Cutters (50, 120, 170) extend outwardly from the outer skirt (40, 118, 168) and may be of fixed construction, while flexible and adjustable cutters (170) may be mounted in through-holes (144) or in unidirectional grips (150).

33 Claims, 6 Drawing Sheets

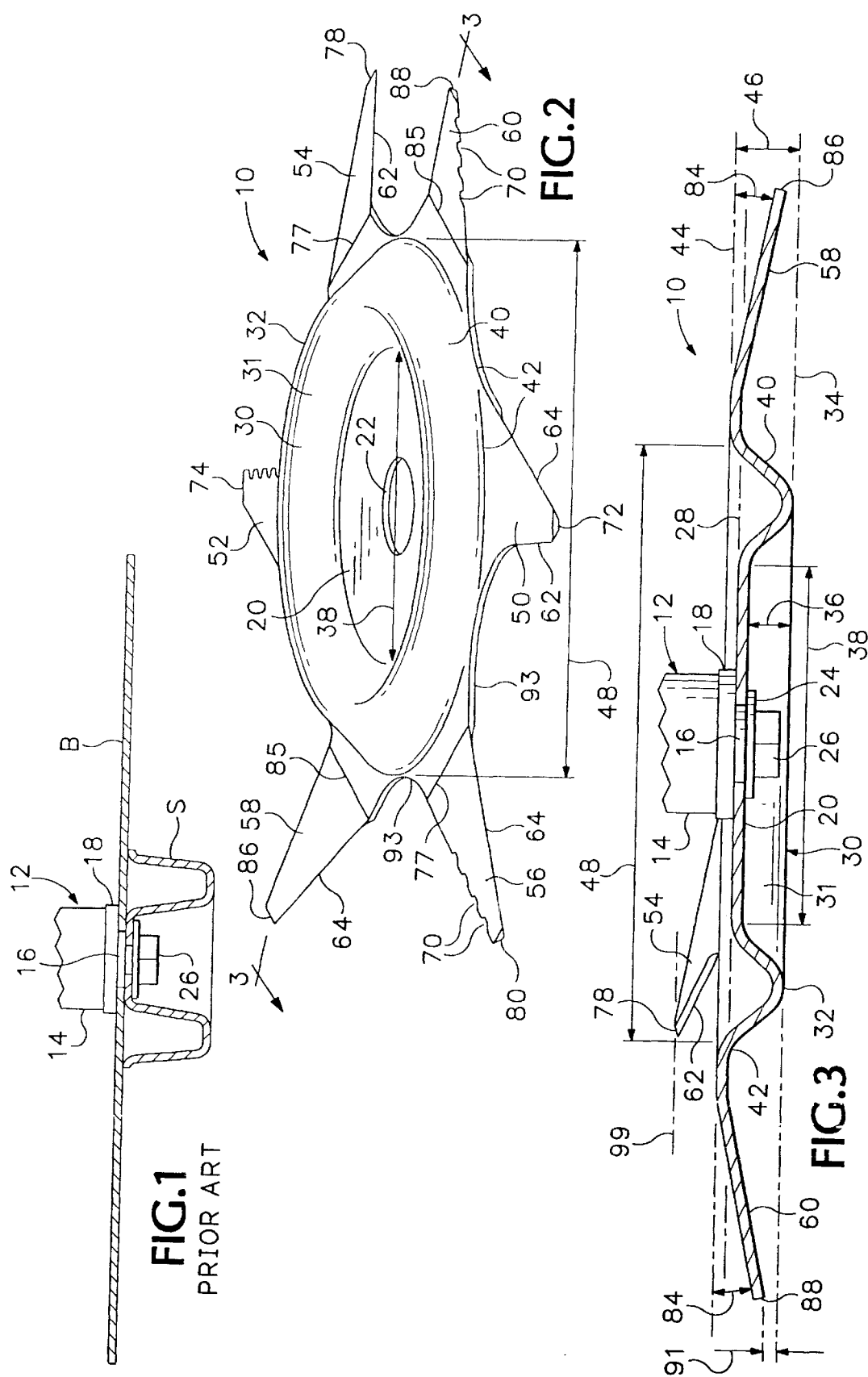

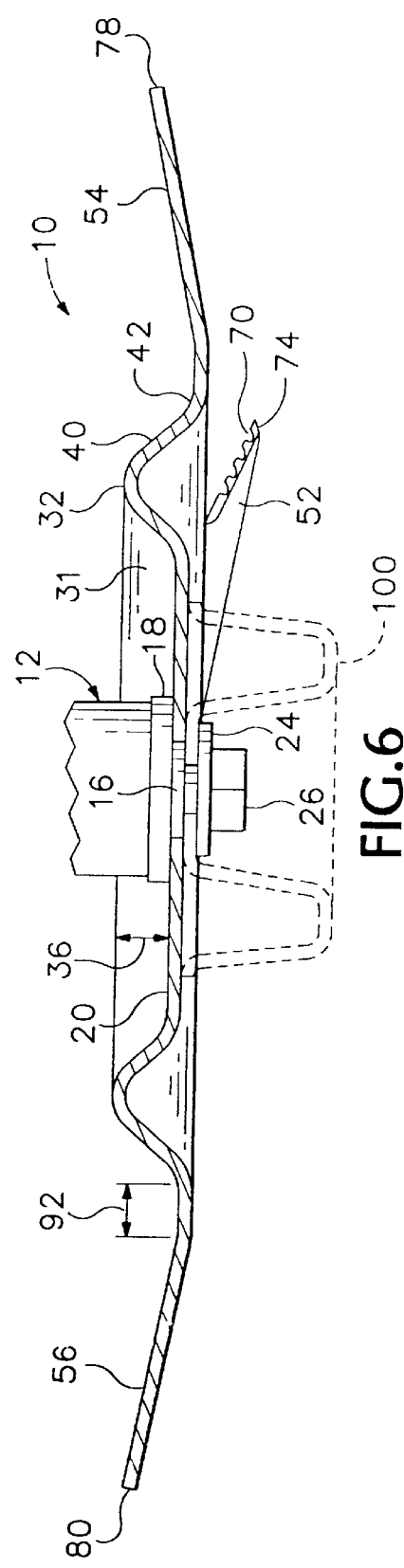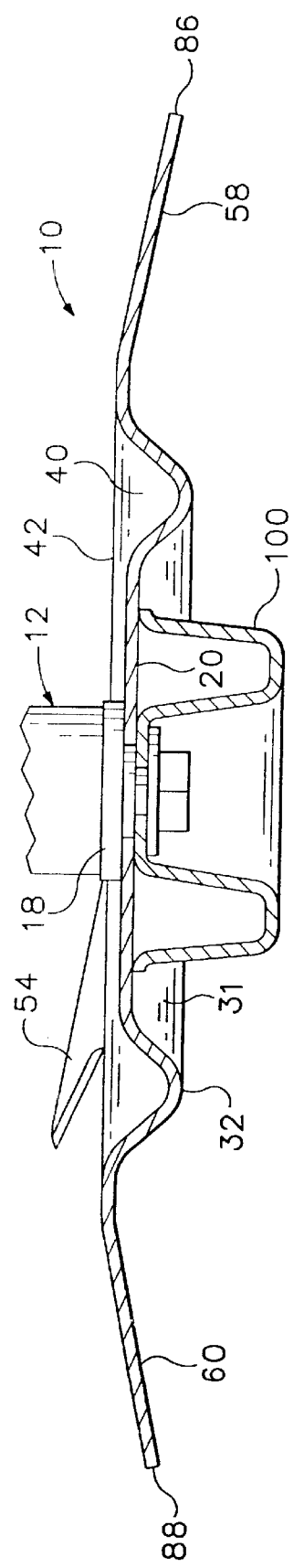

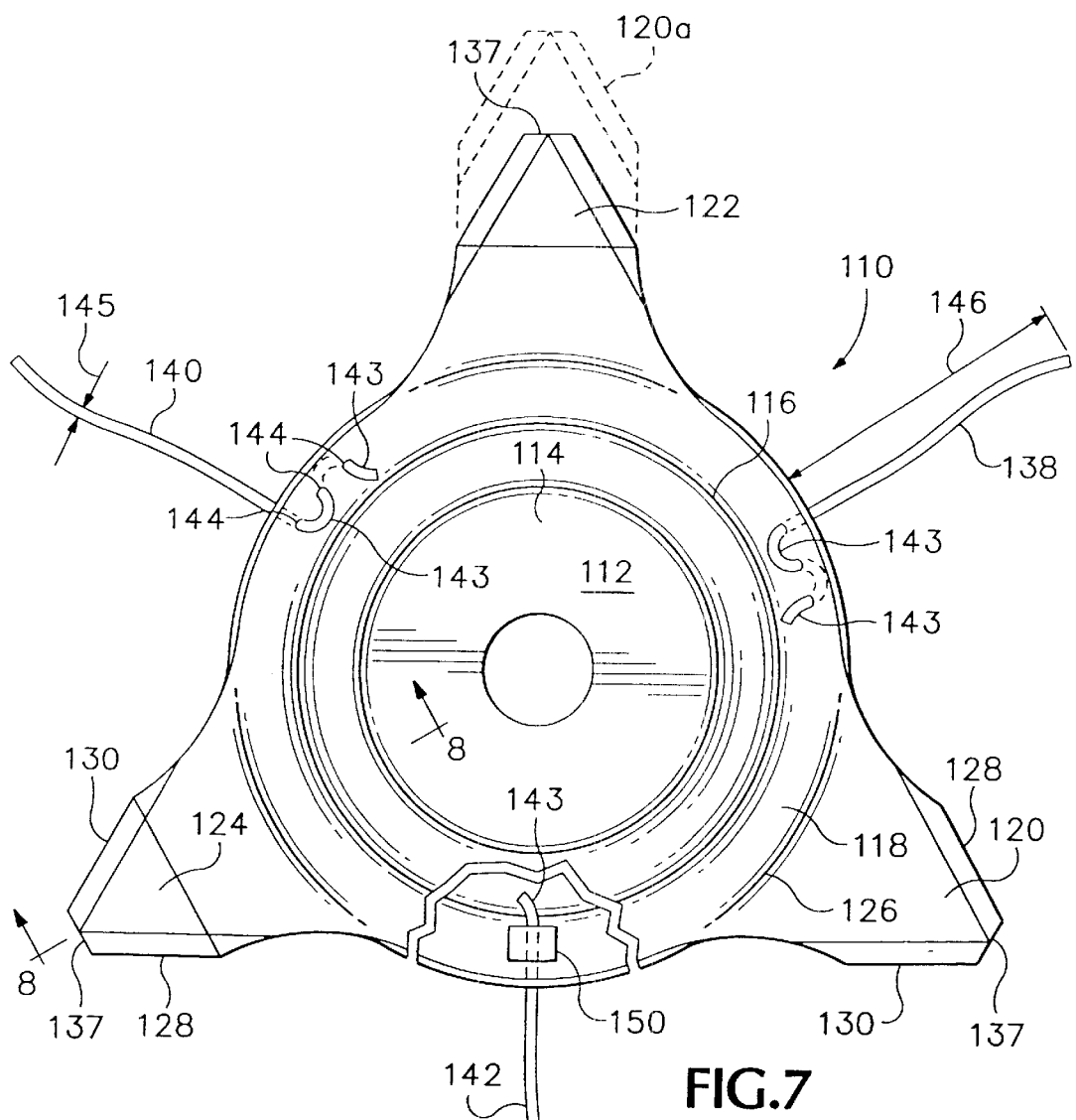
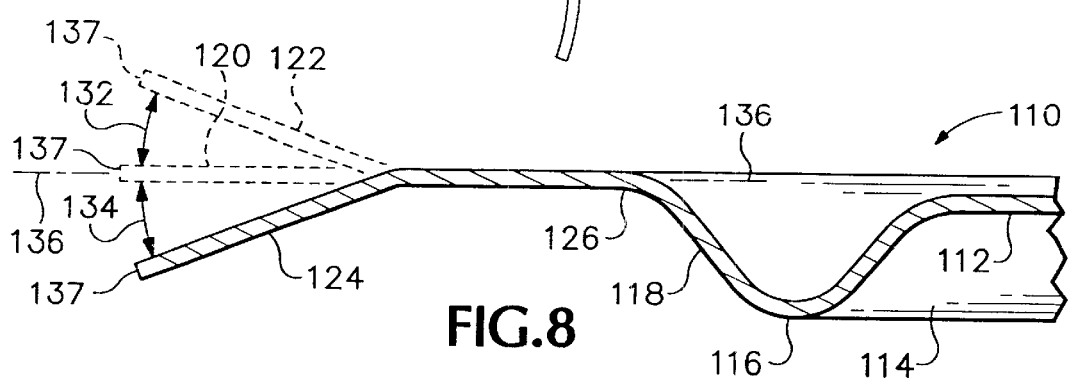

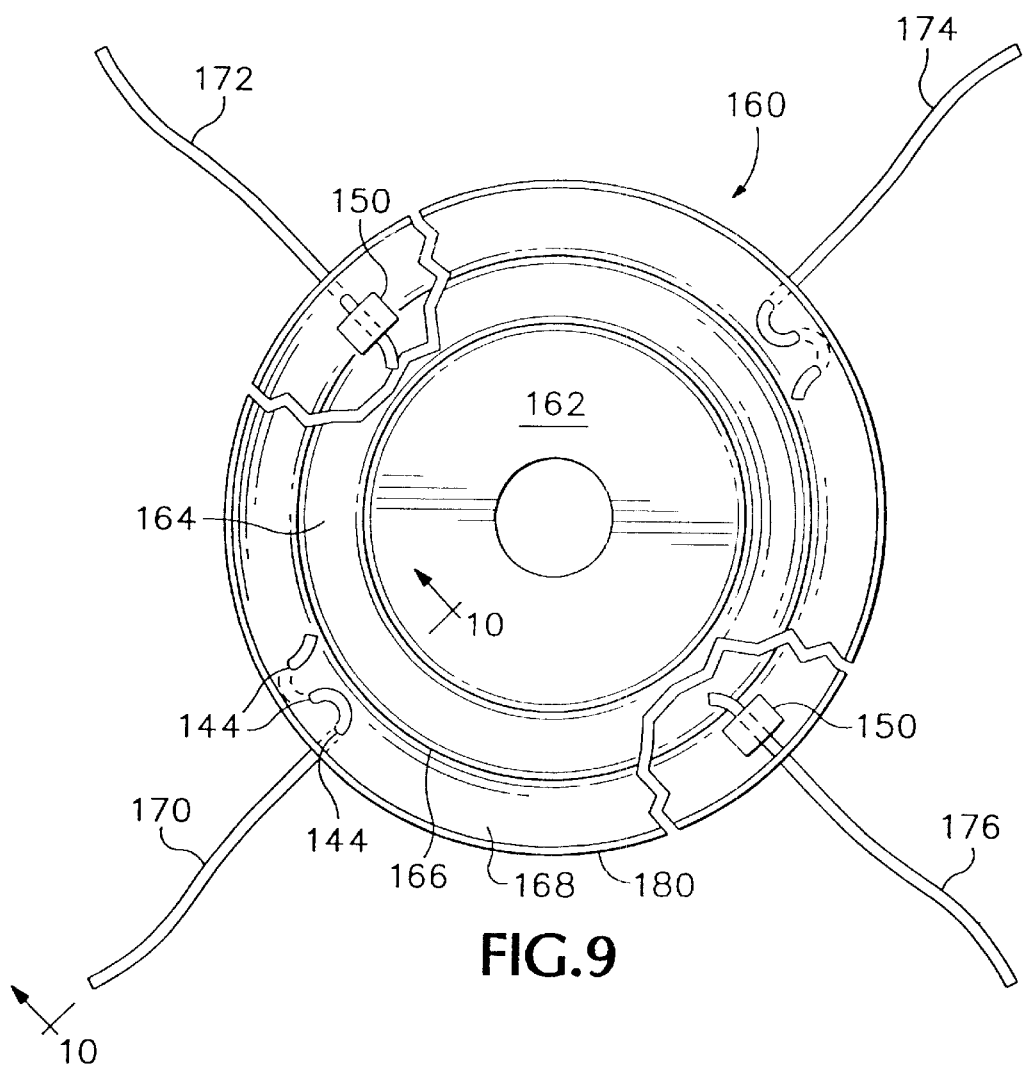
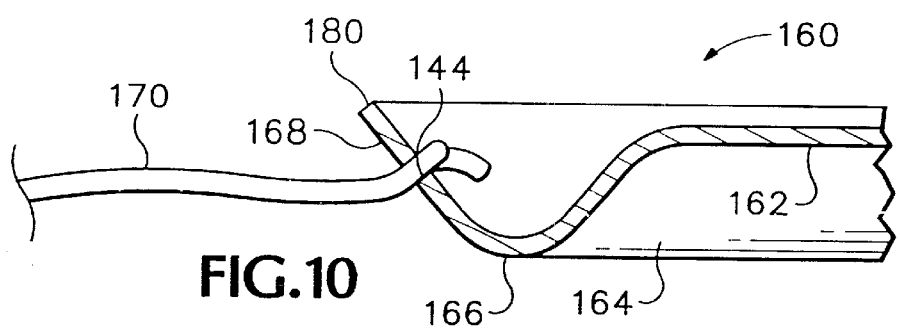

US 6,446,346 B1

ROTARY BLADE FOR TRIMMERS AND BRUSH CUTTERS

This application is a continuation of pending International Patent Application No. PCT/US00/03272, filed Feb. 8, 2000, and claims the benefit of U.S. provisional application Ser. No. 60/121,405, filed Feb. 22, 1999.

TECHNICAL FIELD

The present invention relates to blades intended to be mounted on an arbor or output shaft of equipment such as rotary trimmers and brush cutters, and in particular relates to such blades constructed to include an integral skid plate and to resist having fibrous material accumulate and become wrapped about such a blade or its drive shaft.

BACKGROUND ART

Rotary blades previously known for use on portable trimmers and brush cutters, similar to blades for rotary lawn mowers, have been substantially planar, as shown in blade B in FIG. 1. Such blades include cutter portions having sharpened edges, or wires or plastic filaments extending outwardly from radially outer portions of the blades. Such blades have been useful in trimming grass but have performed less satisfactorily in trimming heavier vegetation such as blackberry canes.

Additionally, such blades on trimmers and brush cutters have been subject to damage or to being dulled by accidentally encountering the surface of the ground in which vegetation is growing, unless tools equipped with such blades have also been equipped with devices such as hollow, cup-like spacers, as shown at S in FIG. 1, extending axially from the shaft on which such blades B are attached, to keep such blades spaced apart from an adjacent surface such as the ground.

Such previously available rotary blades are subject to having grass become wrapped around the drive shaft on which the blades are mounted, thus wasting power actually needed to rotate the blades and periodically requiring the equipment to be stopped and cleaned.

What is desired, then, is an improved blade for use on trimmers, brush cutters, and other rotating shaft equipment, which can be used effectively to cut vegetation to a desired height and to cut portions of such vegetation into pieces effective for use as mulch, and which will perform effectively with significantly less accumulation of fibrous materials wrapped about the driving shaft and otherwise fouling the rotary equipment on which such a blade is to be used.

DISCLOSURE OF THE INVENTION

As an answer to the above-described needs and to the shortcomings of the prior art, the present invention provides a rotary blade for a trimmer or brush cutter, in which a cup includes a hub portion and a concentric cup wall that extends to an annular crown from which a concentric outer skirt extends axially opposite the direction of the cup wall, to protect the arbor-and the point of attachment of the rotary blade to its driving shaft, and in which a plurality of cutters extend outward from the outer skirt, at locations spaced apart from the annular crown in the direction toward the hub portion.

In one preferred embodiment of the present invention a rotary blade has a central hub portion that lies in a first plane, from which a cup wall extends to a crown lying in a parallel second plane, and an cuter skirt extends oppositely from the crown to a third plane parallel with the first and second planes and located, preferably, so that the first plane is between the second and third planes.

In one preferred embodiment of the present invention several cutters extend radially outward from a margin of the outer skirt, and the hub, the cup, the outer skirt, and the cutters are all included in an integral structure.

In one preferred embodiment of the present invention, each of the cutters has an outer tip and at least one of the cutters is shaped so that the outer tips of different cutters rotate about a central axis of rotation of the rotary blade in at least two and preferably three different planes.

In one embodiment of the invention slender flexible cutters are attached adjustably to the outer skirt portion of the rotary blade.

In one embodiment of the invention such flexible cutters may be of a polymeric resin monofilament material and may be attached to the skirt by being inserted through a set of through-holes small enough and located close enough to each other to hold such a piece of monofilament frictionally.

In one embodiment of the invention both fixed, sharpened solid cutters and flexible cutters extend outward from the outer skirt.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a partially sectional view of a prior art rotary cutter and a cup-like accessory for use together with it according to the prior art.

FIG. 2 is an isometric view of the bottom side of a rotary blade for use with a trimmer or brush cutter according to the present invention, shown inverted.

FIG. 3 is a sectional view, taken along line 3—3 of FIG. 2, showing the rotary blade mounted, in its usual upright orientation, on a driven shaft of a power tool such as a trimmer or a brush cutter.

FIG. 6 is a sectional view of the blade shown in FIG. 2, taken along line 3—3, showing the rotary blade mounted on a driven shaft of a power tool such as a trimmer or a brush cutter, with the blade inverted from its normal orientation shown in FIG. 3, and showing in broken line an optional spacer used together with the blade.

FIG. 6a is a view similar to FIG. 3 and also showing in broken line an accessory spacer that may optionally be used together with the rotary blade.

FIG. 7 is a top plan view of a rotary blade which is an alternative embodiment of the present invention.

FIG. 8 is a sectional view, taken along line 88 in FIG. 7, at an enlarged scale.

FIG. 9 is a top plan view of a rotary blade which is another alternative embodiment of the present invention.

FIG. 10 is a sectional view taken along line 10—10 of FIG. 9, at an enlarged scale.

BEST MODES FOR CARRYING OUT THE INVENTION

Referring now to FIGS. 2 and 3 of the drawings which form a part of the disclosure herein, a rotary blade 10 which is a first preferred embodiment of the present invention is of unitary construction, formed, for example, by pressing a sheet metal blank of the appropriate shape and thickness. For example, an appropriately shaped cut from a sheet of annealed spring steel such as type 1075 steel of an appropriate thickness may be pressed to form the shape of the blade 10. Such steel may be of an initial thickness in the range of 0.040–0.125 inch (1.2–3.2 mm), with a preferred thickness of 0.095 inch (2.4 mm), for example.

Alternatively, the rotary blade 10 may be molded of a suitably hard and strong or fiber-reinforced polymeric plastic material, such as a polyamide or a polycarbonace.

Figure 4:
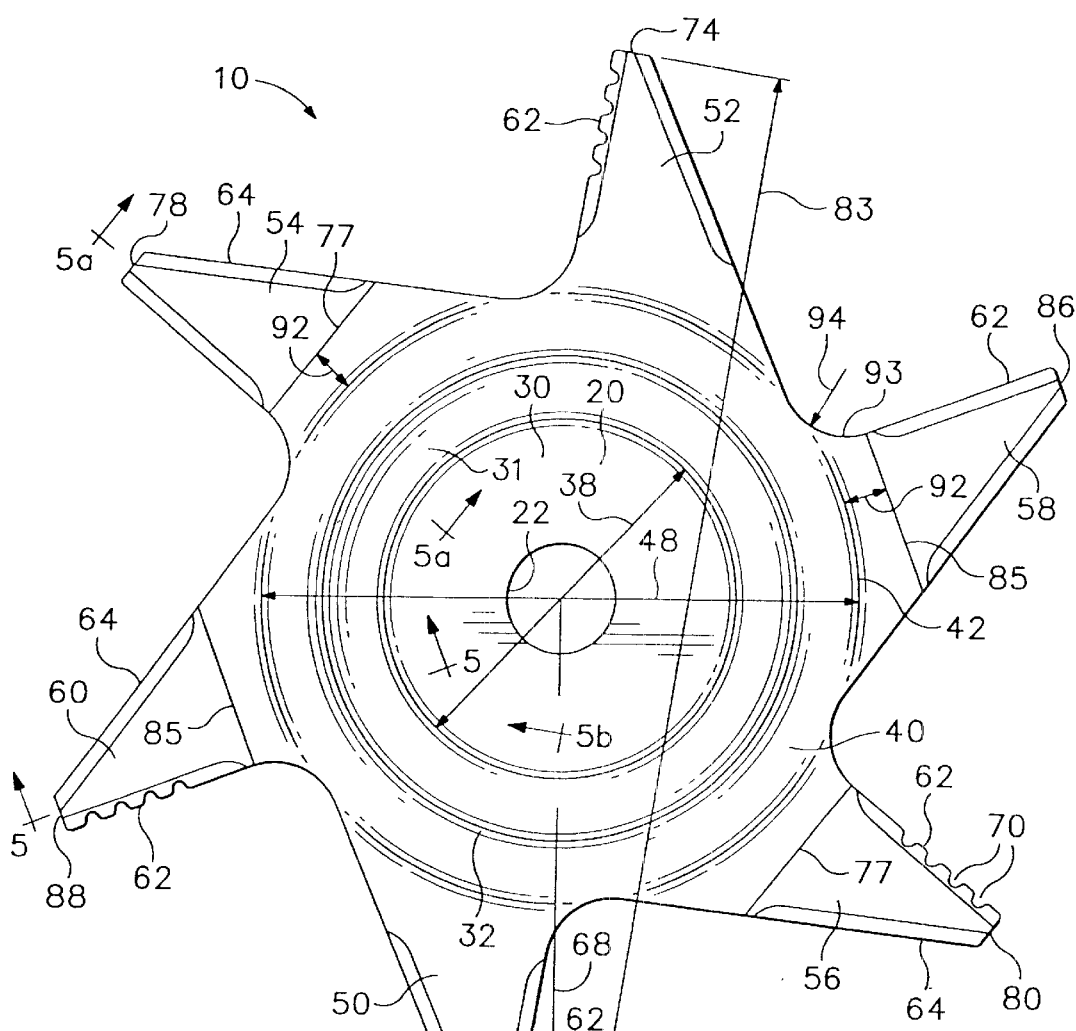
FIG. 4 is a top plan view of the rotary blade shown in FIG. 3.

Referring now also to FIGS. 3 and 4, the rotary blade 10 is shown mounted on an arbor 12 which may be part of a string trimmer, weed cutter, or brush cutter, so that it can be driven by a coupling or gear head (not shown). The arbor 12 includes a bearing support tube 14 housing suitable bearings (not shown) that support a shaft 16 carrying including a flange 18 that closely covers the adjacent end of the support tube 14.

A hub portion 20 of the rotary blade 10 defines a central hole 22 of an appropriate size to receive the outer end of the shaft 16, for example, 0.75–1.0 inch (18–25 mm). A clamping plate or washer 24 is held against the hub 20 by the head of an attachment bolt 26 whose threads are mated with internal threads defined in the end of the shaft 16, attaching the rotary blade 10 to the shaft 16 and the flange 18 for rotation with the shaft.

Figure 5:
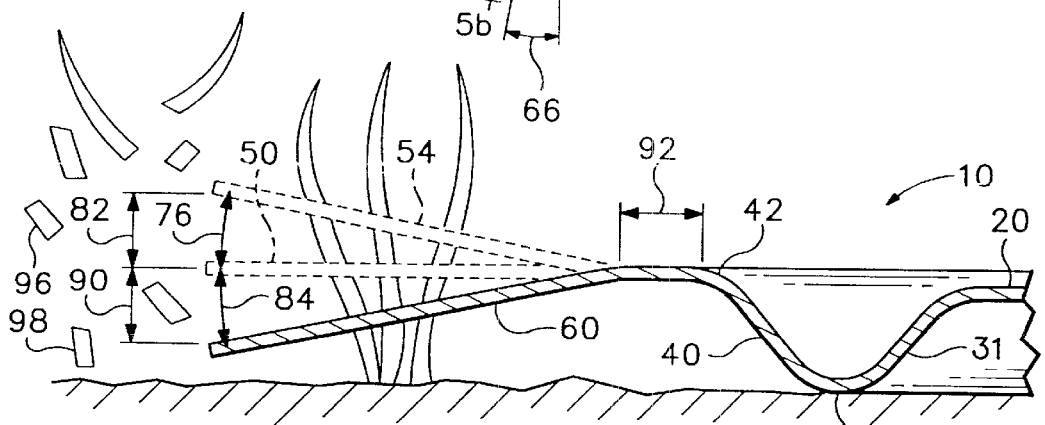
FIG. 5 is a sectional view of a portion of the rotary blade shown in FIG. 4, taken along line 5—5, and showing in broken line rotated projections of cutters, taken along lines 5a—5a and 5b—5b.

In FIG. 2, the rotary blade 10 is shown separated from the arbor 12, and inverted from its normal orientation during use, and the directions mentioned in this paragraph refer to the blade as shown in FIG. 2. The hub 20 is generally flat, and defines a first plane 28 (see FIG. 3) corresponding to the bottom of a cup 30 including a cup wall 31 surrounding the hub 20 and extending away from the first plane 28 to an upper edge of the cup. The top of the cup 30 is defined by a convex annular crown 32 whose convex surface (the upper surface as shown in FIG. 2, but the lower surface in use and as shown in FIGS. 3 and 5) defines a second plane 34 parallel with and located on a first side of the first plane 28, and spaced apart from the first plane 28 by the depth 36 of the cup. The hub 20 portion of the cup has a diameter 38 in the range of about 1-½ inches to 4-¾ inches (38–120 mm), and in the particular rotary blade 10 shown, the diameter 38 is about 2-½ inches (64 mm). The diameter 38 is at least as great as required by the configuration of the arbor 12, so that there is ample space in the cup 30, as for the flange 18 or any other integral attachments to the shaft 16 or its equivalent in a particular trimmer.

The depth 36 may be in the range of about ⅛ inch (3 mm) to about 1 inch (25 mm), and is preferably in the range from ³⁄₁₆ inch to ½ inch (5–13 mm), and for currently available trimmers is most preferably about ½ inch (13 mm) so that the crown 32 will deflect pieces of material being cut by the rotary blade 10 and prevent such material from reaching the arbor 12 to become wrapped around it. As may be seen, the cup wall may merge in a smooth arcuate curve into the first plane 28 of the hub 20, and slopes gradually outwardly, merging into the crown 32 in another arcuately curved surface, for a blade 10 manufactured by pressing a flat metal blank.

An outer skirt 40 extends thence outwardly and downwardly from the crown 32 toward and past the first plane 28 to a margin 42 of the outer skirt that defines a third plane 44 also parallel with the first plane 28. Preferably, as in the rotary blade 10, the third plane 44 is located on an opposite, or second side of the first plane 28 from the location of the second-plane 34, so that the first plane 28 is between the second plane 34 and the third plane 44. The distance between the second plane 34 and the third plane 44 is in the range of ½ inch to 1¼ inches (13–32 mm), and in a preferred embodiment the distance 46 between the second plane and the third plane is about ¾ inch (19 mm). The diameter of the outer skirt 40 at its margin 42 may be in the range from 3½ inches to 7 inches (89–178 mm), and in the illustrated preferred embodiment of the diameter 48 is about 5⅞ inches (149 mm).

As shown in FIG. 3, the rotary blade 10 is in its normal, or upright, orientation, in which the cup 30 is downwardly open. Referring also to FIG. 4, extending radially outward from the margin 42 of the outer skirt 40 are six cutters 50, 52, 54, 56, 58, and 60. It will be understood that fewer cutters, or as many as eighty cutters, might be provided instead, around the margin of the outer skirt 40. The rotary blade 10 is intended to rotate in a counterclockwise direction as viewed in FIG. 3, and each of the cutters 50, 52, 54, 56, 58, and 60 has a respective leading edge 62 and a respective trailing edge 64. Each leading edge 62 has a similar acute angle of incidence 66 with respect to a radius 68 of the rotary blade 10 which may be in the range from leading by 5° (counterclockwise) to trailing by 25° (clockwise). A preferred angle of incidence is for the leading edge 62 to trail by a trailing angle of incidence 66 in the range of trailing by 5° to 25°, and even more preferably, trailing by 10° (clockwise) with respect to a radial line 68 from the center of the rotary blade 10.

The leading edges 62 are generally straight, but may include serrations 70. Preferably, in each pair of cutters arranged diametrically opposite each other one cutter has its leading edge 62 serrated while the other has a smooth leading edge 62. Thus, the leading edges 62 of cutters 52, 56, and 60 include serrations 70, while the leading edges 62 of cutters 50, 54 and 58 do not.

Referring to FIGS. 3 and 5, showing the rotary blade 10 in its normal orientation with respect to the arbor 12, and in section view seen in a direction parallel with the planes 28, 34, and 44, and with views of the cutters 50 and 54 shown rotated in phantom view, it will be seen that the cutters 50 and 52 extend outward away from the margin 42 of the outer skirt 40 substantially entirely in the third plane 44. Thus, the outer tips 72 and 74 of the cutters 50 and 52 are also in the third plane 44. Parts of the cutters 54 and 56, however are inclined upwardly, as shown in FIGS. 2, 3 and 5, so that the leading edge 62 of each of the cutters 54 and 56 is oriented at an angle 76 in the range of 2° to 30° and preferably about 17° with respect to the third plane 44. Consequently, the outer tips 78 and 80 are located at a corresponding distance 82, in the range of about ½ inch to about 1 inch (13–25 mm), and preferably about 0.6 inch (15 mm) upward from the third plane 44 in the blade 10, with the cutters 54 and 56 oriented at a preferred angle 76 of about 17°, and with the rotary blade 10 having a diameter of 83 of 10-⅜ inches (26.35 cm), including the several cutters. Because of the power ratings of different trimmers it may be desirable to reduce or enlarge the diameter 83 to as small as 8 inches (203 mm) or as large as 12 inches (304 mm) with other dimensions proportionately adjusted.

Similarly, each of the cutters 58 and 60 is oriented at an angle 84 downward with respect to the third plane 44, so that the outer tips 86 and 88 are located downward from the third plane 44 by a corresponding distance 90. Preferably the angle 84 is of an equal size, although opposite in direction, from the angle 76. Thus the angle 84 is preferably within the range from 20 to 300 with respect to the third plane 44 as shown in FIG. 5, and the distance 90 is preferably about 0.6 inch (15 mm). Additionally, the second plane 34, defined by the crown 32, is located beneath the outer tips 86 and 88, preferably by a distance 91 of at least about ⅛ inch (3 mm), to help to prevent the outer tips 86 and 88 from cutting into the ground unintentionally when the rotary blade 10 is lowered toward the ground, as may be seen in FIG. 5. All of the cutters, then, are located on the same side of the second plane 34 as are the first plane 28 and the third plane 44. The cutters 54, 56, 58, and 60 are preferably inclined upwardly or downwardly away from the third plane 44 along respective bend lines 77 and 85 each spaced outwardly from the margin 42 of the outer skirt 40 by a distance 92 in the range of 0–1 inch (0–25 mm), and preferably of about 5/16 inch (8 mm).

Each trailing edge 64 extends from the respective outer tip 72, 74, 78, 80, 86, or 88 to the margin 42 of the outer skirt 40 and merges with the leading edge 62 of the following cutter through a margin portion 93 which is concavely arcuate, with a preferred radius of curvature 94 of at least 0.45 inch or greater, in order to avoid concentration of stresses where each leading edge 62 intersects the outer skirt 40.

With the rotary blade 10 fastened to the shaft 16 as shown in FIG. 3, when the rotary blade 10 is rotated at an ordinary speed of rotation for a line trimmer or brush cutter, each leading edge 62 will cut grass or heavier vegetation, including blackberry canes and the like, into short pieces 96, 98 useful as mulch, as shown in FIG. 5. The lengths of the pieces 96, 98 are determined by the upward distance 82, the downward distance 90, and the angle between a particular stem of vegetation and the third plane 44 of the rotary blade 10 as the leading edges 62 strike the particular stem or cane.

As will be understood, the particular angle of incidence 66 and the speed of rotation of the rotary blade 10 will affect the way in which vegetation is cut, but as each stem of grass or the like or cane of blackberries or other heavier vegetation is cut, the surfaces of the outer skirt 40 and the crown 32 deflect pieces and standing stems of vegetation downward and away from the attachment bolt 26 so that material will not be wrapped about the clamping plate 24 or the bolt 26. The outer tips 78 and 80 of the cutters 54 and 56, rotating in a plane 99 located above the third plane 44 and thus above the first plane 28, effectively prevent material of any substantial length from proceeding radially inward above the rotary blade 10 to any position where it could be wrapped about the flange 18, the support tube 14, or the shaft 16.

When the leading edges 62 are oriented at an angle of incidence 66 in a counterclockwise, or leading direction, the rotary blade 10 is more inclined to engage vegetation with thick stems, such as blackberry canes and the like, without bouncing off, while an angle of incidence 66 in a clockwise, or trailing direction, as shown in FIG. 4, may be preferable for cutting grass and throwing it radially away from the rotary blade 10. Also, for cutting grass, the smooth leading edge 62 found on the cutters 50, 54, and 58 will not accumulate fibers of the vegetation being cut, so long as the leading-edge 62 is maintained in a sharp condition.

Preferably, the trailing edges 64 are also sharpened, either by grinding or by coining during manufacture of the rotary blade 10. As a result, the rotary blade 10 is effective when installed on the arbor 12 in an inverted orientation, as shown in FIG. 6, in which the trailing edges 64 will effectively be leading edges as the rotary blade 10 is rotated by the shaft 16. This Will provide an even more pronounced trailing angle of incidence of the trailing edges 64 (acting as leading edges), which may be preferred for cutting closely spaced stems and leaves of vegetation such as heavy grass. In order to keep the cutters 50, etc., from hitting stones or the ground when the rotary blade 10 is thus inverted, a cup 100 may be mounted on the shaft 16 together with the rotary blade 10, as shown in FIG. 6.

Such a cup 100 may be also used with the rotary blade 10 in its normal orientation, as shown in FIG. 6a, if it is desired to ensure additional clearance.

Referring now to FIGS. 7 and 8, a rotary blade 110, which is another embodiment of the invention, includes a hub 112, a cup 114, a crown 116, and an outer skirt 118 all similar to the corresponding parts of the rotary blade 10. Three cutters 120, 122, and 124 extend radially outward from the margin 126 of the outer skirt 118. Each cutter 120, 122, and 124 includes a respective leading edge 128 oriented at a desirable angle of incidence as described above with respect to the leading edges 62 of the rotary blade 10 and a respective trailing edge 130, and the cutters 122 and 124 extend, respectively, at an angle 132 upward and an angle 134 downward with respect to the plane 136 defined by the margin 126 of the outer skirt 118. The outer tips 137 of the cutters 120, 122, and 124 thus rotate in parallel apart-spaced planes (not shown) as do the outer tips 72, 78 and 86 of the cutters of the rotary blade 10 described above. As indicated by the cutter 120a shown in phantom line, the cutters 120, 122 and 124 may extend to a greater length away from the outer skirt 118 to work better on particular trimmers.

In addition to the cutters 120, 122, and 124, the rotary blade 110 includes three slender cutter members 138, 140, and 142 which may be of wire or, preferably, a suitable flexible polymeric filament. The flexible cutters 138 and 140 are attached to the outer skirt 118 by having their inner end portions 143 extending through each one of a set of through-holes 144. Each set consists preferably of three through-holes 144 located close to each other. Each is small enough with respect to the material of the respective flexible cutter 138 so that although the inner end portions 143 of the respective flexible cutters 138 and 140 can be inserted through the through-holes 144 and their positions can be adjusted manually, the flexible cutter material, such as a stiff Nylon or other polymeric monofilament with a thickness, or diameter, 145 in the range of 0.080–0.130 inch (2–3.3 mm), will remain in a desired position with respect to the outer skirt 118 during rotation of the rotary blade 110 and impact of the flexible cutters 138 and 140 against immovable objects. Preferably, each flexible cutter 138 and 140 is adjusted to a length 146 that extends radially beyond the path of the outer tip of each of the cutters 120, 122, and 124, so that the flexible cutters 138 and 140 can be used to trim vegetation along tree trunks, fence posts, and the like where the cutters 120, 122, and 124 would cause damage or be damaged. It will be understood that the blade 110 will also function without any of the flexible cutters 138, 140 and 142, and that provision for their attachment could be omitted in another embodiment of the invention (not shown).

The flexible cutter 142, shown in a broken-away part of FIG. 7, in an otherwise similar alternative embodiment of the invention is held in place on the outer skirt 118, not by a set of through-holes 144, but by a unidirectional grip 150, a mechanical clamping or gripping device 150 shown schematically, acting on its inner end portion 143. Such a unidirectional grip 150 may include a spring-loaded cam grip whose hold on the filament such as a polymeric plastic monofilament increases when tension in an outward direction is applied to the inner end portion 143 of the filament within the unidirectional grip 150, as by centrifugal force during rotation of the rotary blade 110. On the other hand, the effective length 146 of the flexible cutter 142 can be adjusted easily by pushing the monofilament material inward radially through the unidirectional grip 150. The flexible cutter 142 may be removed from the rotary blade 110 by pulling it inward, entirely through the grip 150, when it is desired to replace a particular flexible cutter 142. Such unidirectional grip devices are well known and are included in some available string trimmer heads; such as those made by Kwik Products, Inc. of New York, N.Y.

As in the rotary blade 10, the cup 114, the crown 116, and the outer skirt 118 protect the shaft and arbor on which the rotary blade 110 is mounted, against wear and accumulation of wrapped material, and the crown 116 acts to help prevent the cutters from hitting the ground unintentionally.

Referring to FIGS. 9 and 10, a rotary blade 160 is yet another preferred embodiment of the present invention and includes a hub 162, a cup 164, a crown 166, and an outer skirt 168, all similar to the corresponding parts of the rotary blades 10 and 110. Flexible cutters 170, 172, 174, and 176 are mounted on the outer skirt 168, preferably arranged in two pairs of such cutters, with the cutters of each pair diametrically opposite each other on the outer skirt 168. A greater number of pairs of oppositely located cutters might- also be utilized, and the number of pairs of cutters actually attached to the outer skirt 168 at a particular time may be varied according to the power available in the trimmer or brush cutter on which the rotary blade 160 is mounted.

The flexible cutters may be attached to the outer skirt 168 by the use of sets of through-holes 144, as shown with respect to the flexible cutters 170 and 174, or by the use of unidirectional grip devices 150 as shown with the cutters 172 and 176 and as discussed above with respect to the rotary blade 110. As in the rotary blade 10 and the rotary blade 110, the location of the crown 166-and of the margin 180 of the outer skirt 168 protect the attachment bolt 26 and the arbor 12 of the string trimmer or brush cutter on which the rotary blade 160 is used from having an accumulation of grass and other vegetation wrapped about them, while the crown 166 also serves to prevent the attachment bolt from being worn by being brought into contact against the ground or other objects which would tend to damage or abrade the attachment bolt 26.

It will be understood that it is preferable to utilize sets of through-holes 144 for both of any pair of diametrically opposite ones of the flexible cutter attachments on the rotary blade 160, or else to use unidirectional grip devices 150 for both of any such pair of opposite flexible cutters on the rotary blade 160, in order to preserve dynamic balance of the rotary blade 160.

Figure 11:
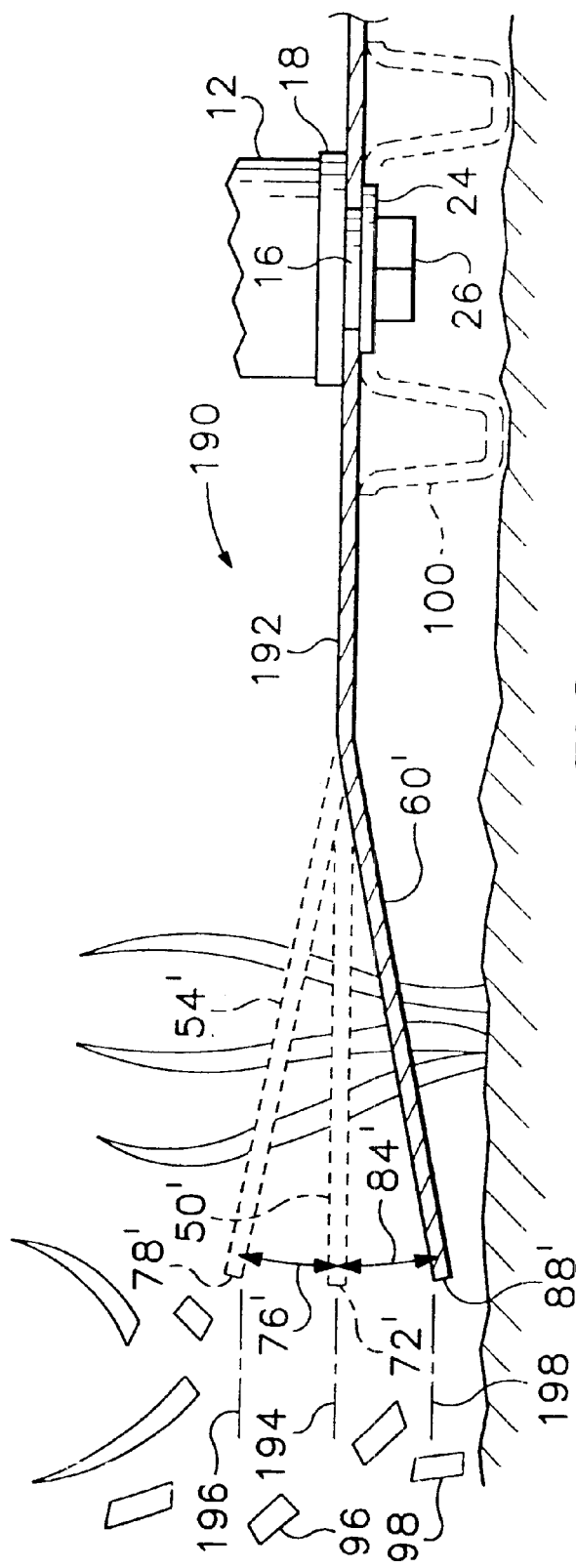
FIG. 11 is a sectional view similar to FIG. 5, showing an alternative embodiment of one aspect of the invention.

In a rotary blade 190 which is yet another embodiment of one aspect of the present invention the central cup 30 and the outer skirt 40 of the rotary blade 10 are omitted, but the blade 190 is otherwise similar. In accordance with this aspect of the invention a central hub portion 192 of the rotary blade 190 is circular and in a single plane 194 as shown in FIG. 11, while the structure outside the central hub portion 192 is essentially similar to the portion of the blade 10 located radially outward from the margin 42 of the outer skirt 40. Some of the cutters, such as the cutter 50' of this rotary blade 190 thus may extend outward in the plane 194 of the central hub portion 192, while at least one of the cutters, such as the cutter 60', is inclined in one direction, or downward, away from that plane at an angle 84', as are the cutters 58 and 60 in the blade 10. At least one other cutter, such as the cutter 54', is inclined in the opposite sense, or upward, at an angle 76' away from the plane 194 of the central hub portion 192, as are the cutters 54 and 56 in the blade 10. The outer tips 72', 78' and 88', etc., of the cutters are thus located in and define at least three different parallel planes 194, 196 and 198 as such a blade 190 is rotated. As a result, the outer tips 78 and 88' and the like are located above and below the plane 196 of the central hub portion 192 when such a blade 190 is in use and can cut vegetation into short pieces 96, 98 useful as mulch, while also throwing the pieces of vegetation outward to reduce any tendency for grass, vines, and similarly fibrous material to become wrapped about the central hub or its driving attachment to a trimmer or brush cutter. To keep such a rotary blade 190 from having the outer tips 72', 78', 88', etc., of its cutters hit the ground, a spacer such as the cup 100 can be used with it.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A rotary blade, comprising:
    (a) a cup including a central hub area defining a first plane and a wall surrounding said hub area extending from said hub area on a first side of said first plane;
    (b) an annular crown adjoining said wall and defining a second plane located on said first side of and parallel with and spaced a first distance apart from said first plane;
    (c) an outer skirt surrounding at least a portion of said cup and extending from said crown to a third plane located parallel with said first plane; and
    (d) a plurality of cutters interconnected with said outer skirt and extending outwardly away from said cup, said cutters being located on the same side of said second plane as is said first plane.

2. The rotary blade of claim 1 wherein said cup, said outer skirt and said cutters are a single integral structure.

3. The rotary blade of claim 1 wherein said first plane is located between said second plane and said third plane.

4. The rotary blade of claim 3 wherein said third plane is spaced apart from said first plane by a predetermined distance.

5. The rotary blade of claim 4 wherein said first distance between said first plane and said second plane defines a cup depth of at least 3/16 inch.

6. The rotary blade of claim 5 wherein said cup depth is in the range of 1/8 to 1 inch.

7. The rotary blade of claim 1 wherein at least one of said cutters has a sharpened edge located substantially entirely in said third plane.

8. The rotary blade of claim 1 wherein at least one of said cutters has a sharpened edge extending parallel with said third plane and at least one other of said cutters has a sharpened edge, at least an outer portion of which extends away from said third plane at a predetermined angle.

9. The rotary blade of claim 8 wherein said predetermined angle is either upward or downward in the range of 2° to 30°.

10. The rotary blade of claim 1 wherein each of said cutters has a sharpened leading edge including an outer tip, said outer tip of at least one of said cutters being located in a plane parallel with said third plane and spaced apart therefrom by a predetermined distance.

11. The rotary blade of claim 10 wherein said predetermined distance is in the range of ½ to 1 inch.

12. The rotary blade of claim 10 wherein said outer tips of at least two of said cutters are located respectively in different planes, each parallel with said third plane, said different planes each being spaced apart from said third plane by a predetermined distance.

13. The rotary blade of claim 12 wherein each of said different planes is spaced apart from said third plane by a different predetermined distance.

14. The rotary blade of claim 12 wherein said predetermined distance is in the range of ½ to 1 inch.

15. The rotary blade of claim 12, including at least one cutter whose outer tip is located in said third plane.

16. The rotary blade of claim 10 wherein said leading edge of at least one of said cutters includes serrations.

17. The rotary blade of claim 1 wherein each of said cutters has a trailing edge, said trailing edges of at least some of said cutters being sharpened.

18. The rotary blade of claim 1 wherein each of said cutters has an outer tip and all of said outer tips are located in respective planes, each of said respective planes being parallel with and spaced apart from said second plane in a direction towards the first plane.

19. The rotary blade of claim 1 wherein each of said cutters has a leading edge and each of said edges has an angle of incidence in the range of leading by 5 degrees to trailing by 25 degrees.

20. The rotary blade of claim 19 wherein said angle of incidence is in the range of trailing by 5 degrees to trailing by 15 degrees.

21. The rotary blade of claim 1 wherein at least one of said cutters is a thin, flexible, elongate member having an inner end portion fastened to said outer skirt.

22. The rotary blade of claim 21 wherein said flexible, elongate member comprises a filament of a polymeric resin material.

23. The rotary blade of claim 22 wherein said outer skirt includes at least one set of spaced-apart through-holes and said filament extends through each of said through-holes of said set and is thereby fastened to said outer skirt.

24. The rotary blade of claim 22, including a unidirectional gripping device attached to said outer skirt and wherein an inner end portion of said filament is held by said gripping device.

25. The rotary blade of claim 21 wherein said flexible, elongate member comprises a wire.

26. The rotary blade of claim 1 wherein at least one of said cutters has a leading edge that includes serrations.

27. The rotary blade of claim 1 wherein said central hub area defines a central hole having a diameter in the range of 18 mm to 25 mm.

28. The rotary blade of claim 1 wherein said central hub area is arranged to permit said rotary blade to be used effectively when mounted on a trimmer in an inverted orientation.

29. The rotary blade of claim 1, having a diameter in the range from 8 inches to 12 inches.

30. The rotary blade of claim 1 wherein said crown extends downward beneath said central hub area as an integral skid plate.

31. The rotary blade of claim a including at least two, but no more than eighty of said cutters.

32. The rotary blade of claim 1 wherein respective ones of said plurality of cutters are arranged relative to said central hub area in respective positions wherein said cutters both cut material into small pieces and also substantially reduce the possibility of cut material being wrapped about a shaft used to drive said rotary blade.

33. The rotary blade of claim 1 wherein at least one of said cutters has a sharpened edge extending outwardly away from said outer skirt and inclined at an angle upwardly away from said second plane defined by said crown.

* * * * *

UNITED STATES PATENT AND TRADEMARK OFFICE
CERTIFICATE OF CORRECTION

PATENT NO. : 6,446,346 B1
DATED : September 10, 2002
INVENTOR(S) : John Charles Castleman It is certified that error appears in the above-identified patent and that said Letters Patent is hereby corrected as shown below:

Column 1,
Line 59, replace "to protect the arbor-and" with -- to protect the arbor and --.
Line 67, replace "and an cuter skirt" with -- and an outer skirt --.

Column 2,
Line 60, replace "taken along line 88" with -- taken along line 8-8 --.

Column 3,
Line 16, replace "polyamide or a polycarbonace" with -- polyamide or a polycarbonate --.

Column 4,
Line 5, replace "second-plane" with -- second plane --.
Line 58, replace "preferred angle 76 of about 170" with -- preferred angle 76 of about 17° --.

Column 5,
Line 4, replace "20 to 300" with -- 2° to 30° --.
Line 63, replace "leading-edge" with -- leading edge --.

Column 6,
Line 3, replace "This Will provide" with -- This will provide --.

Column 7,
Lines 29-30, replace "might-also" with -- might also --.
Line 40, replace "166-and" with -- 166 and --.

UNITED STATES PATENT AND TRADEMARK OFFICE
CERTIFICATE OF CORRECTION

PATENT NO.   : 6,446,346 B1
DATED        : September 10, 2002
INVENTOR(S)  : John Charles Castleman It is certified that error appears in the above-identified patent and that said Letters Patent is hereby corrected as shown below:

<u>Column 10,</u>
Line 26, replace "The rotary blade of claim a" with -- The rotary blade of claim 1 --.

Signed and Sealed this

Fifth Day of August, 2003

JAMES E. ROGAN
*Director of the United States Patent and Trademark Office*